US006262713B1

United States Patent
Brusky et al.

(10) Patent No.: US 6,262,713 B1
(45) Date of Patent: *Jul. 17, 2001

(54) MECHANISM AND METHOD FOR FOCUSING REMOTE CONTROL INPUT IN A PC/TV CONVERGENCE SYSTEM

(75) Inventors: Kevin J. Brusky, Magnolia; Christopher A. Howard, Houston, both of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,521

(22) Filed: Mar. 31, 1997

(51) Int. Cl.[7] ....................................................... G09G 5/08
(52) U.S. Cl. ............................ 345/158; 348/552; 348/734
(58) Field of Search ..................................... 345/156–158, 345/169, 172, 327, 113, 114, 115; 348/552, 734, 584, 600

(56) References Cited

U.S. PATENT DOCUMENTS

| 5,237,653 | * | 8/1993 | Noguchi et al. | 345/113 |
|---|---|---|---|---|
| 5,537,151 | | 7/1996 | Orr et al. | 348/564 |
| 5,675,390 | * | 10/1997 | Schindler et al. | 345/327 |
| 5,694,163 | * | 12/1997 | Harrison | 348/552 |
| 5,745,107 | | 4/1998 | Konomi | 345/332 |
| 5,790,201 | * | 8/1998 | Antos | 348/552 |
| 5,819,156 | * | 10/1998 | Belmont | 345/327 |

FOREIGN PATENT DOCUMENTS

| 06348448 | 12/1994 | (JP) . |
|---|---|---|
| WO 95 18507 | 7/1995 | (WO) . |
| WO 97 04382 | 2/1997 | (WO) . |

OTHER PUBLICATIONS

"Method for Supporting Dual–Input Cursors"; IBM Technical Disclosure Bulletin, vol. 34, No. 6, Nov. 1, 1991, pp. 334–335.

* cited by examiner

Primary Examiner—Regina Liang
(74) Attorney, Agent, or Firm—Sharp, Comfort & Merrett, P.C.

(57) ABSTRACT

A computer system comprising a computer operable in a computer mode for receiving and transmitting computer information, a television mode for receiving and transmitting television information, and a combination computer/television mode for receiving and transmitting computer and television information. A display is operably associated with the computer for displaying in the computer mode the computer information, in the television mode the television information, and in the computer/television mode the computer and television information. The computer system also comprises at least one television window displayed on the display for displaying the television information, at least one computer window displayed on the display for displaying the computer information, a computer focus for the computer window to control the computer information, and a television focus for the television window to control the television information independent of the computer focus.

27 Claims, 4 Drawing Sheets

MECHANISM AND METHOD FOR FOCUSING REMOTE CONTROL INPUT IN A PC/TV CONVERGENCE SYSTEM

BACKGROUND OF THE INVENTION

1. Field of the Invention

The present invention relates to a computer convergence system for converging the functionality of a computer with the functionality of a second electronic device such as a television and, more particularly, to a mechanism and method for focusing remote control input in such a computer convergence system.

2. Description of the Related Art

A personal computer/television (PCTV) convergence system is a fully functional computer integrated with television functionality, providing TV viewing (via broadcast, cable, satellite, VCR, digital disk, or other broadcast media) and personal computing functionality.

A PC/TV convergence device may comprise a fully functional computer including memory, microprocessors, hard drives, floppy drives, fax-modems, CD-ROM player, keyboard, monitor, power supply, mouse, game pad/joy stick, microphone, etc. The computer is interfaced with a National Television Standards Committee (NTSC) signal which is converted to a scan "video graphics adapter" (VGA) signal or the computer's scan VGA signal is converted to an NTSC interface signal.

The PC/TV convergence device is controlled by the computer's operating system (OS). Thus, the monitor can display both TV programs and computer applications either at the same time or separately. Furthermore, the convergence of the functionality of a PC and a TV into a single system also permits the utilization of the communications bandwidth, mass storage and graphics application of the computer to deliver, store and display applications within a television viewing environment.

The PC/TV is a user interactive device. For example, if a user is watching TV, the PC/TV will be able to download information from another source (besides a TV station) information about, among other things, the TV program. Such information can originate from a web site or other data sources.

At present, when televisions and personal computers are separate devices, TVs typically incorporate a remote control. A standard TV remote control may control a variety of television functions or other related functions by communicating control information, via, e.g., infrared (IR) signals, to the TV to indicate which button on the remote control was depressed.

Current computer operating systems utilize a graphical user interface displayed on a display having only a single foreground session with which a user may interact, i.e., input control information to it. When converging the functionality of a computer and a television, current computer convergence systems have adopted this single foreground session standard. Presently, a user may control only the computer functions or the television functions, and a TV remote control is rendered inoperative if the foreground session is a computer application. Thus, what is needed is a computer convergence system having a foreground session for television function control and a foreground session for computer function control.

SUMMARY OF THE INVENTION

Accordingly, the present invention overcomes the above-identified problems as well as other shortcomings and deficiencies of existing technologies by providing a computer system for converging the functionality of a computer with the functionality of a second electronic device. The computer system comprises a computer operable in a computer mode for receiving and transmitting computer information, a second electronic device mode for receiving and transmitting second electronic device information, and a combination computer/second electronic device mode for receiving and transmitting computer information and second electronic device information. The computer system further comprises at least one input device for communicating control information to the computer to control the operation of the computer. A control mechanism operably associated with the input device to receive the control information is provided for controlling the second electronic device information independent of the computer information.

The present invention also provides a method for controlling the operation of a computer in a computer system comprising a computer that is operable in a computer mode, a television mode, and a combination computer/television mode, and a display operably associated with the computer for displaying in the computer mode computer information, in the television mode television information, and in the computer/television mode computer and television information. The method Rises the steps of providing at least one television window displayed on the display for displaying the television information, providing at least one computer window displayed on the display for displaying the computer information, providing a computer focus for the computer window to control operation of the computer, and providing a television focus for the television window to control the television information independent of the computer focus.

The present invention also provides a computer system comprising a computer operable in a computer mode for receiving and transmitting computer information, a television mode for receiving and transmitting television information, and a combination computer/television mode for receiving and transmitting computer and television information. The computer system also includes a display operably associated with the computer for displaying in the computer mode the computer information, in the television mode the television information, and in the computer/television mode the computer and television information. The computer system further includes at least one television window displayed on the display for displaying the television information, at least one computer window displayed on the display for displaying the computer information, and a computer focus for the computer window to control the computer inflation. A television focus is provided for the television window to control the television information independent of the computer focus.

BRIEF DESCRIPTION OF THE DRAWINGS

Other advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

With reference now to the figures wherein like or similar elements are designated with identical reference numerals, there are depicted block diagrams illustrating a method and system according to the present invention. The purpose of these block diagrams is to illustrate the features of the invention and the basic principles of operation of an embodiment thereof. These block diagrams are not necessarily intended to schematically represent particular modules of circuitry or any particular data or control paths.

Figure 1:
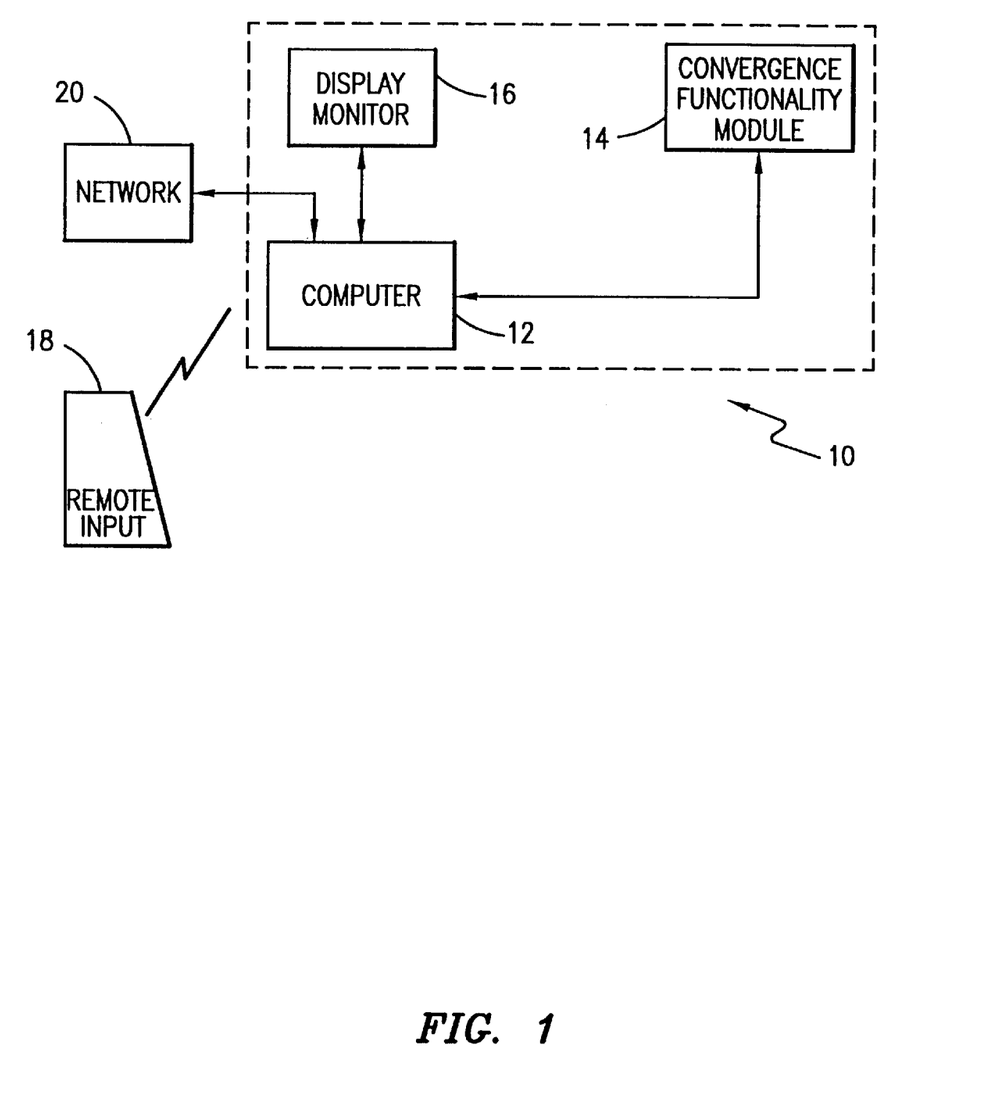
FIG. 1 is a block diagram illustrating a computer system in accordance with the present invention.

Referring now to FIG. 1, there is shown a block diagram illustrating a computer system 10. Computer system 10 includes a computer 12, a convergence functionality module 14, a display monitor 16 and a remote input 18.

Computer 12 may preferably be a personal computer, and although not shown in FIG. 1, includes a processor, memory, data retrieval and storage media and communication data ports. Display monitor 16 is operable to receive and display video signals received from computer 12 and may include an audio output system for playing audio signals received from computer 12.

Computer 12 is coupled to convergence functionality module 14 that is operable to receive or generate data signals, such as video, audio, and graphic information. For example convergence functionality module 14 may comprise a television module or receiver, decoder or tuner capable of receiving television information or signals in the form of the National Television Standards Committee (NTSC) or Phase Alteration Line PAL) forms, from any medium such as from a cable system or from a digital satellite system. Convergence functionality module 14 could also include various other electronic devices such as consumer electronic units. For example, convergence functionality module 14 could also include video gaming units and other direct audio/video sources such as video cassette recorders (VCRs), and video disk player/recorders, including digital versatile disk (DVD) player/recorders.

Computer system 10 may preferably be operated by a user using wireless remote input 18 operating, for example, via radio waves, infra-red waves or acoustic waves. Remote 18 communicates control information to computer 12 and convergence functionality module 14 to control the operation of computer 12 and convergence functionality module 14. Although good results have been achieved using wireless keyboards and remote controls for remote input 18, it is contemplated that any input device, wireless or hardwired, could be used to operate computer system 10.

Still referring to FIG. 1, computer system 10 is configurable to be connected and communicate with a network 20. It is contemplated that network 20 could be an type of network, including a Local Area Network, a Wide Area Network and the Internet.

In general operation, computer system 10 can be operated in various modes. Assuming now that converged functionality module 14 comprises essentially a television module or receiver, computer system 10 can be operated in a computer mode, a television mode, and a combination computer/ television mode. Computer system 10 is operable in the television mode and the combination computer/television mode for receiving and transmitting television information. When in a television mode, personal computer 12 processes the audio and video information received or generated by television module 14, and outputs the corresponding information on display monitor 16. At least two viewing surfaces are possible when computer system 10 is being operated in the television mode: a primary viewing surface and a secondary viewing surface. The displayed image of the primary viewing surface fills the entire viewing screen, with only a portion of the screen dedicated to the viewing of the secondary viewing surface, such as a picture-in-picture (PIP).

Computer system 10 is operable in the computer mode and the combination computer/television mode for receiving, storing and transmitting computer information. When computer system 10 is being operated in the computer mode, computer 12 is utilized to perform computer functions, including executing and running software and interfacing with network 20, with the output of computer 12 being displayed on display monitor 16.

When computer system 10 is being operated in the combination computer/television mode, the functionality of computer 12 and television module 14 are both utilized, including simultaneously displaying computer information and the television information on display monitor 16.

Figure 2:
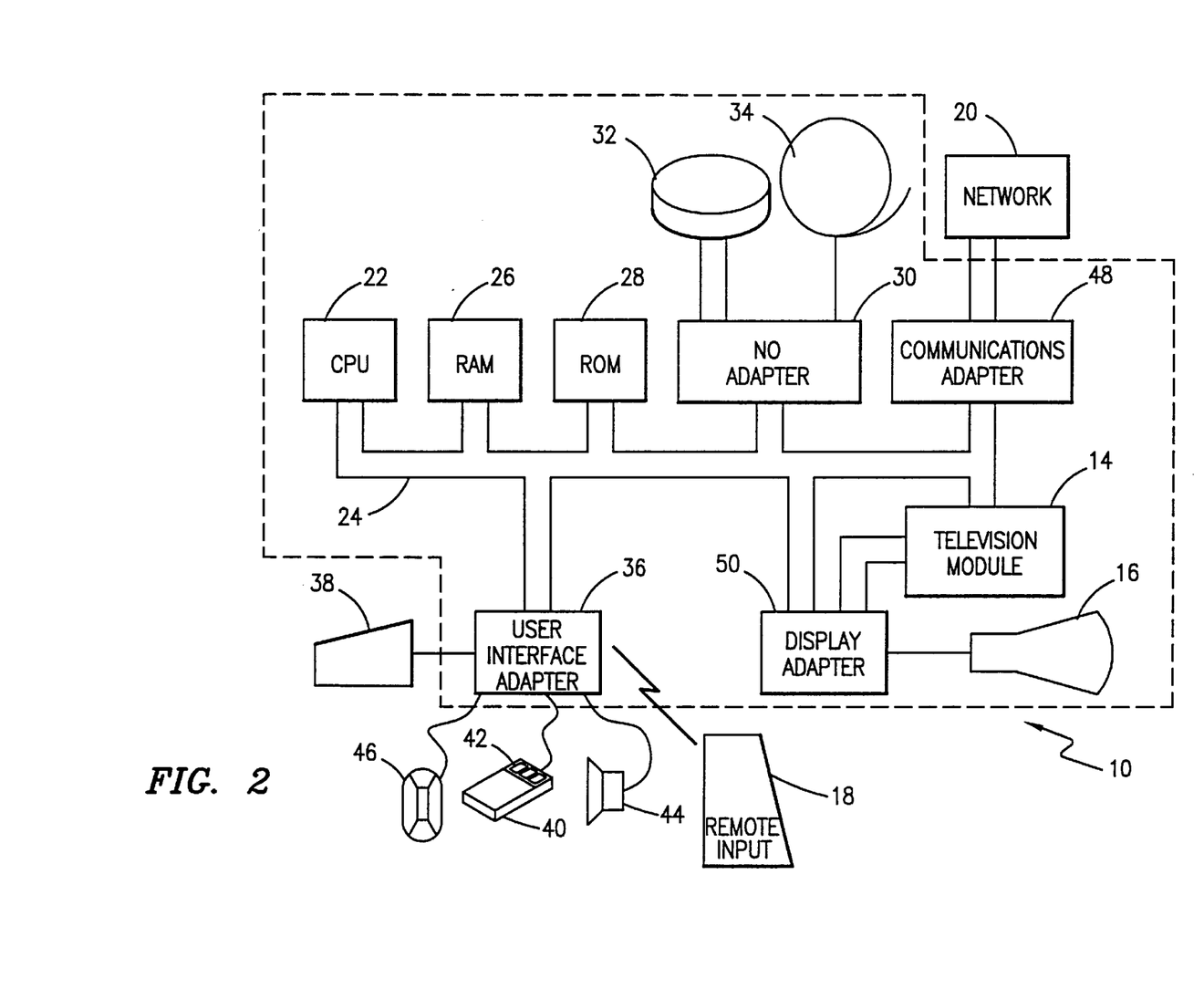
FIG. 2 is a block diagram illustrating an exemplary embodiment of a computer system as illustrated in FIG. 1.

Referring now to FIG. 2, there is shown a more detailed block diagram of an exemplary embodiment of computer system 10. Reference numerals used in FIG. 2 which are like, similar, or identical to reference numerals used in FIG. 1 indicate like, similar, or identical components as depicted in this exemplary embodiment.

Computer system 10 includes at least one processor or central processing unit (CPU) 22. CPU 22 is interconnected via system bus 24 to random access memory (RAM) 26; readily memory (ROM) 28; and input/output (I/O) adapter 30 for connecting peripheral devices such as disk units 32 and tape drives 34 to bus 24; user interface adapter 36 for connecting a hardwire keyboard 38, mouse 40 laving one or more buttons 42, speaker 44, microphone 46, and/or other user interface devices such as a touch screen device (not shown) to bus 24; communication adapter 48 for connecting computer system 10 to a network 20; and display adapter 50 for connecting bus 24 to display monitor 16. User interface adapter 36 is also adapted to receive control information from remote input 18. Computer system 10 further includes a television module 14 coupled to bus 24 and display adapter 50 for receiving television information from network 20 via communications adapter 48 and providing or transmitting the television information to display adapter 50 for display on display monitor 16.

In the following description, for purposes of explanation, specific program procedures, APIs and configurations are set forth to provide a thorough understanding of the present invention. The exemplary embodiment described herein is implemented with a Windows 95 operating system created by Microsoft Corporation (Windows and Windows 95 are trademarks of Microsoft Corporation) and an Intel Corporation X86 series microprocessor. However, it will be apparent to one skilled in the art that the present invention may be practiced in various computer systems having various processors utilizing various operating systems, and in various configurations or makes or models of tightly coupled processors or in various configurations of loosely coupled multiprocessor systems. Details, procedural descriptions and representations which follow are to convey the substance of the instant invention work to those skilled in the art.

Figure 3:
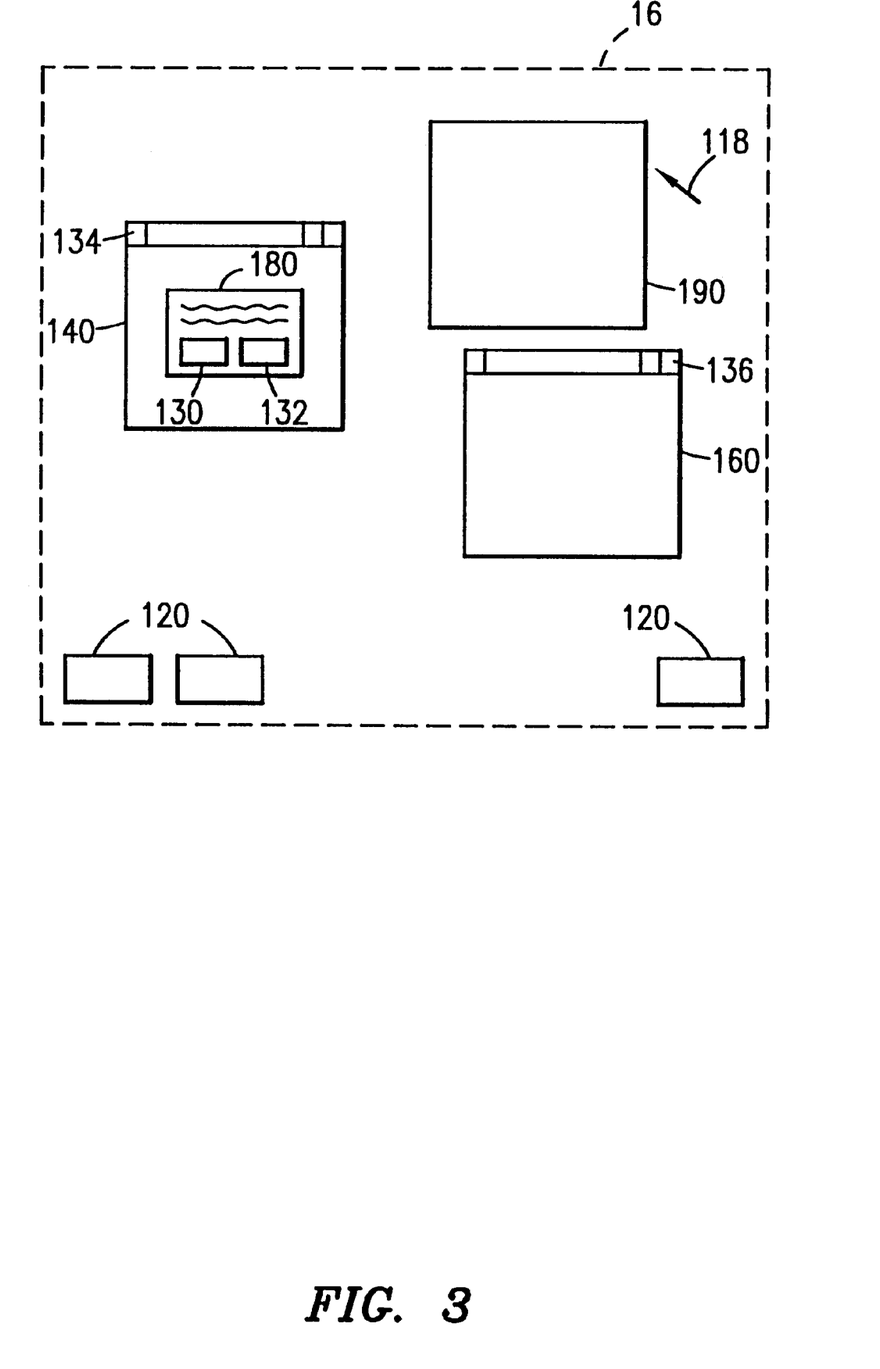
FIG. 3 illustrates an exemplary graphical user interface according to the present invention.

Referring next to FIG. 3, there is used an exemplary graphical user interface (GUI) as displayed on display monitor 16 in accordance with the present invention. The present invention can be implemented either as part of the operating system or as a separate program. The operating system shown in FIG. 3 is Windows 95, but the present invention will work with any GUI. This GUI includes a cursor 118, three icons 120, two computer windows 140, 160, and dialog box 180, all of which are well known in the art. Dialog box 180 contains two buttons 130, 132. Movement of cursor 118 is controlled by mouse 40, keyboard 38, or remote input 18, or any other pointing device, such as a trackball (not shown). When a user moves mouse 40 and/or presses mouse button 42, CPU 10 sends a message to the operating system that a mouse event has occurred. The open system then processes the message by moving cursor 118 and putting the message in an event queue where it can be examined by interested programs. Programs are represented by the GUI as either icons 120 or computer windows 140, 160. The horizontal region along the top of computer window 140, 160 is called the title bar 134, 136. A computer program window 140, 160 has the focus, i.e., computer focus, when it has been designated by the user or operating system to receive input from any one of the input devices 18, 38, 46, 40. In Windows 95, the user gives a window the focus by clicking mouse button 42 when cursor 118 is inside that window. Some operating systems, however, give a window the focus merely whenever cursor 118 is present within that window. The operating system indicates which program has the focus by changing the color of the focused computer window's title bar 134 or 136. In Windows 95, only one program or computer window has focus at any given time. However, it will be appreciated that two or more computer windows may have focus at any given time. It will also be appreciated that any number of computer windows or icons may be displayed on display monitor 16 at any given time.

In accordance with the present invention, the GUI also includes at least one television window 190 having a border displayed on display monitor 16 for displaying the television information. It will be appreciated that any number of television windows may be used and that each television window may display the same or different television information. For example, a first television window may display a first channel while a second television window may display a second channel, wherein PIP may or may not be utilized. Television window 190 may or may not include a title bar similar to title bars 134, 136. It will be appreciated that, although shown as non-overlapping windows, computer windows 140, 160 and television window 190 may overlap one another wherein, for example, television window 190 is within computer window 140 or partially overlaps with computer window 140, or vice versa. Also, computer windows 140, 160 and television window 190 may be minimized, maximized, or otherwise increased or decreased in size, as is well known in the art.

According to the present invention, the operating system's GUI is modified to include a television focus operably associated with input device 18 and television window 190 for allowing input device 18 to control television information indent of the computer focus for computer windows 140, 160 or any other computer windows. The television focus provides a control mechanism operably associated with input device 18 for receiving the control information communicated to computer 12 to control the television information independent of the computer information.

As will be described in greater detail in connection with the description of FIG. 4, input device 18 includes a plurality of inputs or buttons corresponding to a plurality of television functions, such as channel up, channel down, volume up, and volume down. Thus, as an example, the television focus allows a user to change the volume or channel of television information displayed in television window 190 regardless of computer focus on computer windows 140, 160.

Figure 4:
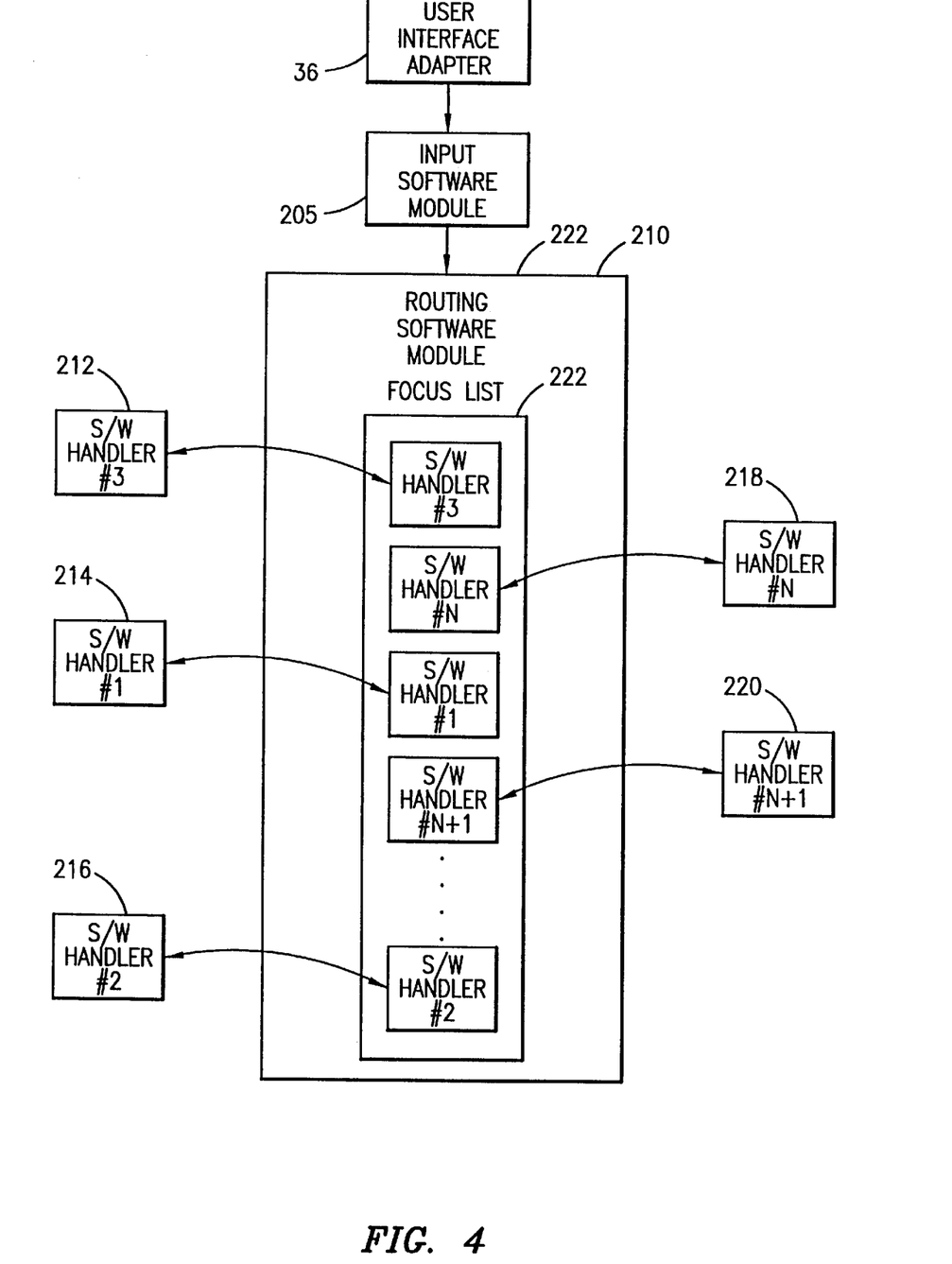
FIG. 4 is a flow control block diagram illustrating a mechanism and method for focusing input in a computer system according to the present invention.

As will be appreciated in connection with the following description for FIG. 4, the present invention provides a system and method for independently controlling two foreground sessions on the GUI depicted in FIG. 3, wherein one foreground session is for controlling television information, and the other foreground session is for controlling computer information.

Referring now to FIG. 4, a flow block diagram illustrating the operation of the present invention is shown. The following can be implemented as part of the operating system or as a separate program.

Remote Control Programming Interface

To receive remote control 18 button press messages or control information, software handlers 212, 214, 216, 218, 220 for controlling television functions corresponding to the button press messages must first register with a routing software module 210 referred to as the RCSP (Remote Control Service Provider) for the buttons they wish to control. For example, software handler 212 may control all channel buttons including channel up and channel down. In this case, software handler 212 would register for or "grab" each channel button pressed. Software handler 214 may control all PIP functions, such as PIP channel control and PIP sizing. Software handler 214 would then register or grab all PIP button presses. Software handler 216 controls all audio or volume control functions and therefore registers for those corresponding button presses, and so on. There are n possible software handlers corresponding to n television functions. Multiple handlers may register for the same remote button or remote buttons. Once registered, button press messages are received from user interface adapter 36, forwarded to an input software module 205 and forwarded to RCSP 210 to determine which handler 212, 214, 216, 218, 220 receives notification.

While multiple software handlers 212, 214, 216, 218, 220 may wish be notified of remote button presses, in most cases only a single software handler will ever get notified of a button press. To determine which handler receives notification, RCSP 210 looks through a focus list 222 of software handlers and sends the message to the first handler in the list which is registered for that button.

Software handlers 212, 214, 216, 218, 220 can change their order in the list by calling RCSP 210 to capture focus. A handler may similarly get itself placed at the end of focus list 222 by calling RCSP 210 to release television focus. When focus list 222 is changed, RCSP 210 sends all handlers a message notifying them of the change. If a handler wishes to know which buttons it currently has television focus of, it can request this information from RCSP 210. Button press notifications are sent as messages to the appropriate software handler.

The following provides details on one possible scheme for registering for remote buttons, capturing and releasing television focus, and using the remote button press messages.

Remote Button Press Registration

Before a button press software handler 212, 214, 216, 218, 220 can be notified of button presses, it must first register with RCSP 210. The top-level RCSP 210 interface is a dynamic link library referred to as CPQRCSP.DLL called by the following:

DWORD WINAPI RCSPRegisterButtons(HWND hWnd,
BYTE *pbButtons, WORD wButtonCount)

where
- hWnd is the window handle for the button press software handler,
- pbButtons is a pointer to an array of remote code bytes indicating which buttons are to be registered (see Remote Control ID Table below for an exemplary list of buttons and corresponding remote ID codes), and
- wButtonCount is a count of the number of buttons in the pbButtons array.

The following table describes exemplary remote button codes which may be registered for:

Remote Control ID Table

| Button | Remote Code |
|---|---|
| RCSP_BUTTON_REV | 00h |
| RCSP_BUTTON_PLAY | 01h |
| RCSP_BUTTON_FWD | 02h |
| RCSP_BUTTON_REC | 03h |
| RCSP_BUTTON_STOP | 04h |
| RCSP_BUTTON_PAUSE | 05h |
| RCSP_BUTTON_1 | 06h |
| RCSP_BUTTON_2 | 07h |
| RCSP_BUTTON_3 | 08h |
| RCSP_BUTTON_4 | 09h |
| RCSP_BUTTON_5 | 0ah |
| RCSP_BUTTON_6 | 0bh |
| RCSP_BUTTON_7 | 0ch |
| RCSP_BUTTON_8 | 0dh |
| RCSP_BUTTON_9 | 0eh |
| RCSP_BUTTON_10 | 0fh |
| RCSP_BUTTON_INPUT | 10h |
| RCSP_BUTTON_ANTENNA | 11h |
| RCSP_BUTTON_PIP | 12h |
| RCSP_BUTTON_FREEZE | 13h |
| RCSP_BUTTON_CH_CTROL | 14h |
| RCSP_BUTTON_SWAP | 15h |
| RCSP_BUTTON_SIZE | 16h |
| RCSP_BUTTON_VOL_UP | 17h |
| RCSP_BUTTON_VOL_DOWN | 18h |
| RCSP_BUTTON_MUTE | 19h |
| RCSP_BUTTON_CH_UP | 1ah |
| RCSP_BUTTON_CH_DOWN | 1bh |
| RCSP_BUTTON_WHO | 1ch |
| RCSP_BUTTON_SKIP | 1dh |
| RCSP_BUTTON_RESET | 1eh |
| RCSP_BUTTON_GO_BACK | 1fh |
| RCSP_BUTTON_CLEAR | 20h[2] |
| RCSP_BUTTON_GUIDE | 21h |
| RCSP_BUTTON_TCE_MENU | 22h |
| RCSP_BUTTON_TCE_INFO | 23h |
| RCSP_BUTTON_UP_ARROW | 24h |
| RCSP_BUTTON_DN_ARROW | 25h |
| RCSP_BUTTON_RT_ARROW | 26h |
| RCSP_BUTTON_LT_ARROW | 27h |
| RCSP_BUTTON_LO_BAT | 28h |
| RCSP_BUTTON_SAT_CABLE1 | 37h[1] |
| RCSP_BUTTON_MON_POWER | 38h[1] |
| RCSP_BUTTON_INTV | 39h |
| RCSP_BUTTON_VCR1 | 3ah[1] |
| RCSP_BUTTON_AUDIO | 3bh |
| RCSP_BUTTON_SAT_CABLE2 | 3ch[1] |
| RCSP_BUTTON_DVD_VCR2 | 3dh[1] |
| RCSP_TV_PC | 3eh[1] |
| RCSP_BUTTON_POWER | 3fh[1] |

[1]These are the only buttons which are passed through when the system is in Suspend mode. See the section Receiving Button Press Messages When System in Suspend Mode below for more details.
[2]When this button is pressed, a message is sent to every handler registered for that button, regardless of which handler has television focus for the button.

RCSPRegisterbuttons( ) returns a DWORD, which is a handler ID identifying a specific software handler. This ID is used in other RCSP 210 calls to capture or release television focus, deregister buttons, etc. An error value of NULL will be returned if the call failed or if focus list 222 contained invalid button IDs. In the event that an error is returned, none of the requested buttons will be registered.

When a handler successfully registers a button software handler, it will automatically gain television focus of the requested buttons. For an in-depth discussion on gaining and releasing television focus, see the section below titled Capturing and Releasing Focus.

Receiving Notification of Button Presses

Button Pre software handlers will receive the button press message as defined above as notification of a button press.
RCSP_REMOTE_BUTTON_PRESS

| nButtonCode | =(int) wParam; | //button press |
|---|---|---|
| lBtnData | =lParam; | //button data | where ButtonCode is the remote ID of the button being pressed (from the Remote Control ID Table above), and lBtnData specifies the repeat count and transition-state flag, as follows:

| BIT | |
|---|---|
| 0–15 | Specifies the repeat count. The value is the number of times the button keystroke is repeated as a result of the user holding down the button or key. |
| 16–30 | Reserved; do not use. |
| 31 | Specifies the transition state. The value is always 0 if the button is being pressed and 1 if the button is being released. |

Note that normally only a single handler will be notified of a single button press. There may be some buttons which may be broadcast to all handlers, i.e., all handlers are notified of the button press. An example of such a broadcast button would be clear, since all handlers are expected to clear windows or other information from display monitor 16.

Capturing and Releasing Television Focus

RCSP 210 maintains focus list 222 of button press software handlers 212, 214, 216, 218, 220 and for each button press determines the proper handler to be notified of the button press (per the RCSP_REMOTE_BUTTON_PRESS message above). To determine the correct handler, RCSP 210 starts at the head of focus list 222 and searches for a handler which has registered for the button which was pressed. The first handler in focus list 222 which is registered for the pressed button, i.e., the handler that has television focus for the pressed button, will receive the RCSP_REMOTE_BUTTON_PRESS message. The handler which receives this message is said to have the television focus for that button. A button press message is normally only sent to a single handler, except as noted above.

When a handler is first registered, it has the television focus for all buttons that it has registered for (since it is placed at the front of the list). However, as additional handlers are registered, the original handler may lose television focus of some of its buttons if new handlers register for those same buttons.

At other times, a button press software handler may have the television focus and wish to release it temporarily to allow other software handlers to process those button press messages. This would normally happen if an application is minimized. When a handler releases television focus, RCSP 210 moves its corresponding node or list entry to the end of focus list 222.

Thus, handlers are able to change their order in focus list 222. To support this, a call RCSPFocusControl( ) is made, as follows:

```
WORD WINAPI RCSPFocusControl(BOOL bFocus,
    DWORD dwHandlerID)
    where bFocus is either RCSP_RELEASE_FOCUS or
RCSP_CAPTURE_FOCUS, and
    dwHandlerID is the ID of the button press software
        handler, as returned from the call
        RCSPRegisterButtons( ).
```
RCSPFocusControl( ) returns RCSP_SUCCESS if there is no error, or RCSP_FAILURE if an invalid handler ID is passed in.

When a software handler releases television focus, it should not assume that it will not receive button press messages. If it is the only software handler registered for a given button, then it will receive these button press messages, which it may simply ignore.

Notifying Handlers of Television Focus Change

Whenever a software handler 212, 214, 216, 218, 220 is moved to the front of focus list 222, it is possible that other handlers will no longer receive certain button press messages. Handlers have no way of knowing when they lose television focus in this way unless RCSP 210 notifies them. This notification will take place whenever RCSPFocusControl( ) or RCSPRegisterButtons( ) is called to put a new handler to the front of focus list 222. Handlers are also notified when RCSPFocusControl( ) is called to release television focus, or to RCSPButonso which may bring other handlers into television focus.

This notification takes the form of a message which is posted by the RCSP whenever any of the above circumstances occurs:
    RCSP_REMOTE_FOCUS_CHANGE

| Unused    | =wParam;  | //RCSP_CHANGED_FOCUS            |
| HandlerID | =lparam;  | //ID of handler that now has focus | where HandlerID) is the ID of the software handler at the front of focus list 222. A handler has captured television focus when the HandlerID matches their own, and lost television focus if the HandlerID does not match.

Note that it is not necessary for software handlers to process this message. Most handlers will not need to know when they have lost or gained television focus. A handler can lose television focus but not necessarily lose control of their buttons. For instance, if a new handler registers for the Power button, it will gain television focus even though Power is not a button registered for the current handler. To determine which buttons the handler has registered for, see the RCSPGetButtons function described below.

Button Query

Handlers may call into RCSP 210 to determine what remote control buttons they currently control, or they may wish to determine which buttons a handler currently having the television focus controls as a result of a RCSP_REMOTE_FOCUS_CHANGE message. A button query is made as follows:
```
    WORD WINAPI RCSPGetButtons(WORD
        dwHandlerID, BYTE *pbButtons,WORD
        *pwButtonCount);
        where dwHandlerID is the ID of the handler, as
            returned from the
    RCSPRegisterButtons( ) routine or focus change
        message,
        pbBottons is a pointer to an array of buttons which the
            handler currently controls, and
        pwButtonCount is a pointer to a word containing the
            number of remote control button codes in the buttons
```
array. This value should be the maximum number of buttons that can be returned (i.e., the size of the pbButtons array). Upon success, this value will reflect the actual number of buttons returned.

The return values for this call will be as follows:
RCSP_SUCCESS Command completed successfully;
RCSP_FAILURE Invalid handler ID.

Simulating Remote Button Presses

It is possible to simulate remote control button presses by calling the RCSP routine WORD WINAPI RCSPSimRemote(BYTE bButton);
    where bButton is the remote control code as found in the Remote Control ID Table above.

The return values for this call will be as follows:
RCSP_SUCCESS Command completed successfully;
RCSP_FAILURE Invalid remote control ID.

RCSP 210 will teat this button press as it would if it came from remote control 18; traversing list 222 and posting a message to the first handler registered for that button to simulate button down. Another message will be sent immediately afterwords to simulate button up. In other words, for each call to RCSPSimRemote( ), the RCSP will generate two messages: one for button press and another for button release.

Receiving Button Press Messages When System in Suspend Mode

When computer system 10 is in a Suspend mode (i.e., user has turned the unit "off"), no button press messages will be passed through the system except those which cause the system to return from Suspend. These "power" buttons are noted in the Remote Control ID) Table, above.

Deregistering the Handler

It is very important that a button software handler deregister before closing their application or a handler may no longer wish to receive button press or focus change messages. In either case, the RCSPDeregisterButtons( ) function can be called:
```
    DWORD WINAPI RCSPDeregisterButtons(DWORD
        dwHandlerID)
        where dwHandlerID is the ID assigned by
            RCSPRegisterButtons( ).
```
This call returns to following values:
RCSP_SUCCESS Command completed successfully;
RCSP_FAILURE Invalid remote control ID.

RCSP 210 also may perform focus list 222 clean-up periodically in order to remove handlers from list 222 which fail to deregister.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 26 of one or more computer systems configured generally as described in FIG. 2. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for managing user inputs, the method comprising the steps of
registering a first software handler with a routing software module, the first software handler registering for control of a first of a plurality of input buttons of a user input device;
adding the first software handler to a focus list, the focus list being associated with the first of the plurality of input buttons of said user input device;
registering a second software handler with the routing software module, the second software handler registering for control of the first of the plurality of input buttons of said user input device;
adding the second software handler to the focus list;
receiving an input button press message, the input button press message indicating that the first of the plurality of input buttons of said user input device has been activated;
searching the focus list to select which of the first software handler and the second software handler should receive an indication of the input button press message; and
routing the indication of the input button press message to the software handler selected to receive the indication of the input button press message.

2. The method of claims 1, wherein the first and second software handlers are associated with TV control functions.

3. The method of claims 1, wherein the first and second software handlers are operatively associated with a first window for providing television focus.

4. The method of claim 1, wherein the step of searching comprises the step of searching the focus list to select the first listed software handler in the focus list that is registered for control of the first of the plurality of input buttons of said user input device.

5. The method of claim 4, wherein the second software handler is initially the first listed software handler that should receive the indication of the input button press message, the method further comprising the step of:
identifying the first software handler to be the first listed software handler in the focus list.

6. The method of claim 5, further comprising the step of:
notifying the second software handler that the first software handler has been identified as the first listed software handler in the focus list.

7. The method of claim 6, wherein the focus list is an ordered list.

8. A method of routing user inputs in a PC/TV system, the method comprising the steps of:
registering a plurality of software handlers for control of a first of a plurality of input buttons of a user input device;
ordering indications of the plurality of software handlers according to which of the plurality of software handlers should receive an indication of an activation of the first of the plurality of input buttons of said user input device;
selecting the one of the plurality of software handlers that should receive an indication of the activation of the first of the plurality of input buttons of said user input device, the selection based upon the ordered indications of the plurality of software handler;
routing a received indication of the activation of the first of the plurality of input buttons of said user input device to the selected one of the plurality of software handlers; and
executing an instruction set associated with both the first of the plurality of input buttons of said user input device and the plurality of software handlers.

9. The method of claim 8, further comprising the step of:
reordering the indications of the plurality of software handlers such that a second of the plurality of software handlers should receive the indication of the activation of the first of the plurality of input buttons of said user input device.

10. The method of claim 9, further comprising selecting both the first of the plurality of software handlers and the second of the plurality of software handlers to receive the indication of the activation of the first of the plurality of input buttons of said user input device.

11. The method of claim 8, further comprising the step of:
notifying the first of the plurality of software handlers that the second of the plurality of software handlers should receive the indication of the activation of the first of the plurality of input buttons of said user input device.

12. A PC/TV system comprising:
a display device;
a convergence functionality module connected to the display device, the convergence functionality module for causing images to be displayed on the display device;
a computer processor connected to the display device, the computer processor for causing images to be displayed on the display device;
a memory device connected to the computer processor, the memory device comprising executable instructions readable by the computer processor to thereby cause the computer processor to:
register a plurality of software handlers for control of a first of a plurality of input buttons of a user input device;
order indications of the plurality of software handlers according to which of the plurality of software handlers should receive an indication of an activation of the first of the plurality of input buttons of said user input device;
select the one of the plurality of software handlers that should receive an indication of the activation of the first of the plurality of input buttons of said user input device, the selection based upon the ordered indications of the plurality of software handlers;
route a received indication of the activation of the first of the plurality of input buttons of said user input device to the selected one of the plurality of software handlers; and
execute an instruction set associated with both the first of the plurality of input buttons of said user input device and the plurality of software handlers.

13. The PC/TV system of claim 12, wherein the memory device further comprises:
instructions to thereby cause the computer processor to:
reorder the indications of the plurality of software handlers such that a second of the plurality of software handlers should receive the indication of the activation of the first of the plurality of input buttons of said user input device.

14. The PC/TV system of claim 12, wherein the memory device further comprises instructions to thereby cause the computer processor to:
notify the first of the plurality of software handlers that the second of the plurality of software handlers should receive the indication of the activation of the first of the plurality of input buttons of said user input device.

15. A method for managing user inputs, the method comprising the steps of
registering a plurality of software handlers with a routing software module, at least some of the plurality of software handlers each registering for control of a plurality of input buttons of said input device;
adding said software handlers to focus lists, each said focus list being associated with an individual one said input buttons, said registration of the software handlers determining to which focus list or focus lists said software handlers are added;
in response to activation of an input button of said input device, said routing software module receiving an input button press message from said activated input button;
said routing software module searching the focus list associated with said activated input button to select a software handler on that focus list which should receive an indication of the input button press message; and
said routing software module routing the indication of the input button press message to the software handler selected to receive the indication of the input button press message.

16. The method of claim 15, wherein the registration of said software handlers can be selectively changed for controlling a different button or different buttons of said input device.

17. The method of claim 15, wherein the step of searching comprises the step of selecting the focus list for the first listed software handler in the focus list that is registered for control of the activated input button of said user input device.

18. The method of claim 17, further comprising the step of:
effecting replacement of a first listed software handler in the focus list for a particular input button of said input device by a different software handler.

19. The method of claim 18, further comprising the step of:
notifying said first listed software handler of the replacement by said different software handler as the first listed software handler in the focus list for said particular input button.

20. The method of claim 15, also including registering a plurality of software handlers for control of a designated input button of said input device wherein receiving an input button press message from said designated button of said input device, routes the indication of the designated input button press message to all of the software handlers registered for control of said designated button.

21. A PC/TV system comprising:
a display device coupled to a computer processor and to a convergence functionality module to receive signals operable to control functions associated with display of images on said display device;
a memory device coupled to the computer processor, the memory device comprising executable instructions readable by the computer processor to thereby cause the computer processor to:
register a plurality of software handlers with a routing software module, at least some of the plurality of software handlers registering for control of more than one input button of said user operable input device;
for each input button of said input device associated with more than one registered software handler, order prioritization indications of the associated registered software handlers according to which of said associated software handlers should receive an indication of an activation of that input button of said user input device;
in response to activation of one of said plurality of input buttons of said input device associated with more than one registered software handler, select, based on said ordered prioritization, which of said associated registered software handlers should receive an indication of the activation of the activated input button;
route a received indication of the activation of said activated input button of said user input device to the selected one of the plurality of associated registered software handlers;
execute an instruction set operably associated with both the activated input button of said user input device and the selected associated registered software handler; and
selectively change the software handlers registered for control of an input button and to change the order of said prioritization indications of the software handlers registered for control of an input button.

22. The PC/TV system of claim 21, wherein the memory device also comprises executable instructions readable by the computer processor to thereby cause the computer processor to:
register a plurality of software handlers for control of at least one designated input button of said input device, and in response to activation of said at least one designated input button, to route an indication of said activation to all of the software handlers registered for control of said at least one designated input button.

23. The PC/TV system of claim 21, wherein, the memory device also comprises executable instructions readable by the computer processor to thereby cause the computer processor to:
execute an instruction set operably associated with both an activated input button of said user input device and the selected associated registered software handler when the computer processor is in a suspend state, only in response to activation of one or more predetermined input buttons of said input device.

24. The PC/IV system of claim 21, wherein said processor is operable to provide computer focus to control functions associated with display of images in at least one computer window of said display device; and said processor is operable in conjunction with said convergence functionality module to provide TV focus to control functions associated with display of images in at least one TV window of said display device, independently of operation of said processor to provide computer focus.

25. A PC/TV system comprising:
a display device coupled to a computer processor and to a convergence functionality module to receive signals operable to control functions associated with display of images on said display device, said processor operable to provide computer focus to control functions associated with display of images in at least one computer window of said display device; said
processor operable in conjunction with said convergence functionality module to provide TV focus to control functions associated with display of images in at least one TV window of said display device, independently of operation of said processor to provide computer focus; and a user input device having input buttons for activation to selectively control operations of said processor and of said convergence functionality module associated with said computer focus and with said TV focus;

a memory device coupled to the computer processor, the memory device comprising executable instructions readable by the computer processor operating cooperatively with said convergence functionality module to:

register a plurality of software handlers with a routing software module for control of input buttons of said user input device corresponding to a plurality of TV functions, said software handlers including software handlers registering for control of more than one said input button of said user operable input device;

for each said input button of said input device associated with more than one registered software handler, order prioritization indications of the associated registered software handlers according to which of said associated software handlers should receive an indication of an activation of that input button of said user input device;

in response to activation of a said input button of said input device associated with more than one registered software handler, select, based on said ordered prioritization, which of said associated registered software handlers should receive an indication of the activation of the activated input button;

route a received indication of the activation of said activated input button of said user input device to the selected one of the plurality of associated registered software handlers;

execute an instruction set operably associated with both the activated input button of said user input device and the selected associated registered software handler; and in response to activation of one of said plurality of input buttons of said input device associated with more than one registered software handler, based on said ordered prioritization, select which of said associated registered software handlers should receive an indication of the activation of the activated input button;

route a received indication of the activation of said activated input button of said user input device to the selected one of the plurality of associated registered software handlers;

execute an instruction set operably associated with both the activated input button of said user input device and the selected associated registered software handler; and selectively change the software handlers registered for control of an input button and to change the order of said prioritization indications of the software handlers registered for control of a said input button corresponding to one of said TV functions.

26. The PC/TV system of claim 25, wherein the memory device also comprises executable instructions readable by the computer processor to thereby cause the computer processor to:

register a plurality of software handlers for control of at least one designated input button of said input device and in response to activation of said at least one designated input button, to route an indication of said activation to all of the software handlers registered for control of said at least one designated input button.

27. The PC/TV system of claim 25, wherein the memory device also comprises executable instructions readable by the computer processor to thereby cause the computer processor to:

execute an instruction set operably associated with both an activated input button of said user input device and the selected associated registered software handler when the computer processor is in a suspend state, only in response to activation of one or more predetermined input buttons of said input device.

* * * * *